United States Patent
Loftus et al.

(10) Patent No.: US 9,511,676 B2
(45) Date of Patent: Dec. 6, 2016

(54) PORTABLE EV ENERGY TRANSFER APPARATUS AND METHOD

(71) Applicant: Ford Global Technologies, LLC, Dearborn, MI (US)

(72) Inventors: Michael E. Loftus, Northville, MI (US); John Proietty, Ferndale, MI (US); Fazal U. Syed, Canton, MI (US); Ben A. Tabatowski-Bush, South Lyon, MI (US); Perry R. MacNeille, Lathrup Village, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/169,787

(22) Filed: Jan. 31, 2014

(65) Prior Publication Data

US 2015/0217656 A1    Aug. 6, 2015

(51) Int. Cl.
*H02J 7/00* (2006.01)
*B60L 11/18* (2006.01)

(52) U.S. Cl.
CPC .......... *B60L 11/1842* (2013.01); *H02J 7/0065* (2013.01); *H02J 2007/0067* (2013.01); *Y02T 90/168* (2013.01); *Y04S 30/12* (2013.01)

(58) Field of Classification Search
CPC ...... H02J 7/0065; H02J 7/0067; H02J 7/0031; H02J 7/0047; Y02E 60/12; G01R 31/3648; H01M 10/48

(Continued)

(56) References Cited

U.S. PATENT DOCUMENTS 6,104,160 A   8/2000  Iwata
7,839,020 B2  11/2010 Nakanishi
(Continued)

FOREIGN PATENT DOCUMENTS

JP        11178241 A2    7/1999

OTHER PUBLICATIONS

Bhaskar Vairamohan, State of Charge Estimation for Batteries, Master of Science Thesis, University of Tennessee, Dec. 2002, pp. 1-89.*

(Continued)

*Primary Examiner* — Richard Isla Rodas
*Assistant Examiner* — Mohammed J Sharief
(74) *Attorney, Agent, or Firm* — Maristyn Law LLC; Lynda F. Kouroupis; David B. Kelley

(57) ABSTRACT

Systems, apparatus, and methods are presented to transfer energy between an energy storage device (ESD) at an electrified vehicle (EV) and an AC or DC external load such as an electric grid, appliance or power tool. A portable EVETA can engage an EV charge inlet couple an EV, and can provide an AC outlet, a grid interface and a DC connector for coupling external loads. An EVETA can be used at a remote construction site or campsite to power high current equipment, obviating the need to transport an electric generator. An EVETA can be configured for data and control communication with the EV to coordinate energy transfer. An EVETA can receive a predetermined ESD state of charge limit so that the transfer process can be terminated to preserve sufficient charge for EV return to a desired destination. A human machine interface enables user input reception and information display.

16 Claims, 6 Drawing Sheets

(58) Field of Classification Search
USPC .......................................................... 320/136
See application file for complete search history.

(56) References Cited

U.S. PATENT DOCUMENTS

| | | | | |
|---|---|---|---|---|
| 2002/0087908 A1* | 7/2002 | Dossey | ...................... | G06F 1/28 713/340 |
| 2005/0162018 A1* | 7/2005 | Realmuto | .................. | H02J 1/10 307/44 |
| 2010/0109836 A1* | 5/2010 | Sakuma | .................. | B60R 25/02 340/5.61 |
| 2010/0301809 A1* | 12/2010 | Bhade | ................. | B60L 11/1824 320/148 |
| 2011/0204720 A1 | 8/2011 | Ruiz | | |
| 2011/0241824 A1* | 10/2011 | Uesugi | ............................ | 340/5.8 |
| 2011/0309674 A1 | 12/2011 | Kamachi | | |
| 2012/0194128 A1* | 8/2012 | Laberteaux | ......... | B60L 11/1818 320/109 |
| 2013/0127413 A1* | 5/2013 | Ohtomo | .................. | B60L 3/003 320/109 |
| 2013/0193907 A1* | 8/2013 | Thomas | ................ | B60L 3/0069 320/107 |
| 2013/0257145 A1* | 10/2013 | Caldeira | ............... | B60L 3/0046 307/9.1 |
| 2013/0315040 A1* | 11/2013 | Malkin | .................. | G04D 99/00 368/10 |
| 2014/0327405 A1* | 11/2014 | Carkner | ......................... | 320/128 |
| 2014/0375272 A1* | 12/2014 | Johnsen | .................. | B60L 11/16 320/136 |
| 2015/0048791 A1* | 2/2015 | Veiga | .................. | B60L 11/1816 320/109 |

OTHER PUBLICATIONS

Nissan Says Electric Car Can Power Family Home http://www.physorg.com/news/2011-08-nissan-electric-car-power-family.html Aug. 2, 2011.

A Car That Could Power Other Electric Devices, Byte News Library, http://bytelib.com/a-car-that-could-power-other-electric-devices/; Mar. 22, 2012.

Elizabeth Boyle, "UD V2G: Newark First to License Electric Cars to Provide Power"; UD Daily http://www.udel.edu/udaily/2009/jan/electriccar011409.html.

* cited by examiner

PORTABLE EV ENERGY TRANSFER APPARATUS AND METHOD

FIELD OF INVENTION

This invention relates generally to electrified vehicles, and more particularly to transferring energy from a battery of an electrified vehicle to an external load.

BACKGROUND OF INVENTION

An electrified vehicle (EV) utilizes a high voltage traction battery or other type of energy storage device (ESD) to provide propulsion energy for an electric drive system. When the energy level is reduced or depleted, the battery can be charged by coupling the EV to a residential electric grid or to a public or commercial charging station. Fully charged, the battery can store energy for future driving operations. In the recent past, it has been suggested that the energy stored at an EV battery can be used for operations other than driving the vehicle. For example, it has been proposed that the battery of an electric vehicle be used to provide energy back to a residential electric grid. A vehicle-to-home (V2H) energy transfer process can reduce home utility costs as energy can be stored in a vehicle battery during low-demand, low energy cost time periods, then accessed during time periods in which energy costs are higher. In addition, as a home electric grid is connected to a municipal utility grid, energy transferred to the home grid can also be used supplement a utility electric grid during peak demand times. U.S. Patent Publication No. 2011/0204720 to Ruiz et al. explains how such a system could be configured. However, the Ruiz system requires an extensive and complex network of control and monitoring modules in addition to the electrical circuitry and equipment necessary to conduct the actual energy transfers between the vehicle, home grid and utility grid.

Describing a less ambitious system, U.S Patent Application Publication 2011/0309674 to Kamachi discloses a power control system that can be used to supply power to a residence during a power outage. While narrower in scope than the Ruiz system, and thus somewhat less complex, the Kamachi system relies on a power converter installed at a building that is coupled to first and second batteries at an electric vehicle. The first battery, the vehicle traction or driving battery, is used to provide energy that the power converter can transfer to the home electric grid, and the second battery, the vehicle auxiliary battery, used for vehicle auxiliary equipment such as lights, air conditioner, etc., is used to power operation of the power converter itself. An equipment controller installed at the house can control the energy converted at the power converter.

While adequate for their intended purposes, the proposals described above, as well as other prior art directed to V2H applications, suffer several shortcomings. For example, both require additional equipment to be installed at a residence, the installation and servicing of which may be beyond the price point considered affordable by many consumers. In addition, many such systems, like the Kamachi system described above, include an equipment controller installed at the building. This feature can impose limitations on the manner in which energy can be transferred, such as a limitation that stored energy can be transferred from a vehicle battery only when the vehicle is tethered to a residential or commercial/industrial building. When the appliances or electrical equipment to be powered reside at the building, this limitation may prove insignificant. For example, if a vehicle battery is being used to provide power to a refrigerator, stove or other appliance at the building during a power outage, reliance on a controller at the building, and connection of the vehicle to the building, do not pose any problem. However, this type of system cannot be used in a situation in which an operator would like to use a vehicle's battery to power equipment that is not within the building, or is not connected to the home's electric grid. For example, a user on a camping trip may desire to use a vehicle's battery energy to power equipment such as a heater, microwave oven, air conditioner, etc. at a remote campsite. Alternatively, a construction worker may need power for operating high current electric tools and power equipment such as drills, saws, air compressors and the like at a worksite. In either case, since there is no building grid to tap into, the proposed systems cannot address the immediate need.

SUMMARY OF THE INVENTION

The present invention provides a system for transferring energy from an energy storage device (ESD) at an electrified vehicle (EV) to a load external to the vehicle. In an example embodiment, a system comprises an EV and a portable, EV energy transfer apparatus (EVETA) configured to receive a DC input and provide an AC output. The EVETA can be configured to couple the EV; for example, an EVETA cable can be configured to engage an EV charge inlet, as well as couple various types of external loads, both fixed and transportable. By way of example, a load can comprise a microgrid, a public utility grid, or a commercial charging station, as well as a transportable load, such as an electric appliance, a power tool, or military equipment. In an example embodiment, an EVETA can be configured to provide a DC output as well as an AC power output.

In an example embodiment, an EVETA can comprise a portable housing at which a means for receiving an external AC load is disposed, a means for coupling an EV, and an electronics assembly configured to transfer energy between said EV and a load external to said EV and said EVETA. As a means for coupling an EV, an example EVETA can comprise a cable terminated with a connector configured to engage a charge inlet at an EV, with the cable and connector configured to enable data communication between the EVETA and the EV. An EVETA can comprise an AC outlet for receiving and coupling an AC load and providing an AC output. In addition to providing an AC output, an EVETA can further be configured with a DC connector to couple a DC load and provide a DC output. In an example embodiment, an EVETA can further comprise a means for coupling and providing an output to an electric grid; for example, an EVETA can comprise an interface for a grid-tied inverter with net-metering capability. An EVETA can further comprise a human machine interface for receiving input from, and providing information to, an operator.

An example method can include a portable EVETA coupling an EV, the EVETA coupling a load external to said EV, and the EVETA transferring energy between the EV and the external load. Transferring energy between said EV and said external load can comprise providing an AC and/or DC output to the load. By way of example, transferring energy between the EV and the load can comprise receiving a DC voltage from a traction battery at the EV, converting the received voltage, and providing an output comprising said converted voltage. In an exemplary embodiment, a method can include performing an authorization process prior to performing the energy transfer. The authorization process can protect against energy theft by unauthorized users. In addition, a method can include receiving a predetermined SOC limit for an ESD at the EV and monitoring ESD SOC to avoid ESD overdischarge.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the specification. The figures are not drawn to scale and related elements may be omitted so as to emphasize the novel features of the invention. Structural and functional details depicted in the figures are provided for the purpose of teaching the practice of the invention to those skilled in the art, and are not to be interpreted as limitations. For example, control modules for various systems can be variously arranged and/or combined and may be omitted in illustrations of example embodiments herein in order to better emphasize novel aspects of the invention.

Figure 1:
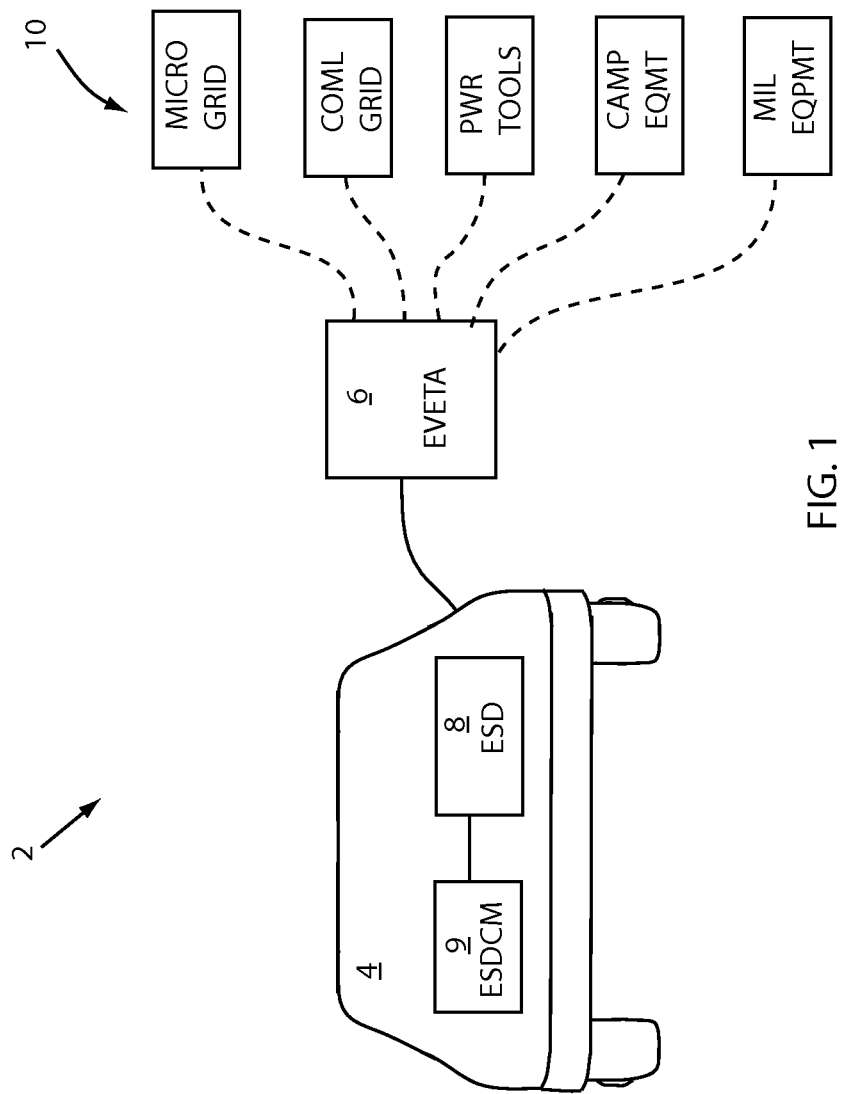
FIG. 1 shows an example system that includes an electrified vehicle (EV) energy transfer apparatus (EVETA).

Turning now to the Drawings, in which like reference numerals refer to like elements throughout the several views, FIG. 1 shows an example system 2 for transferring energy from an electrified vehicle (EV) to an external load. The system 2 comprises an EV 4 electrically coupled to an EV energy transfer apparatus (EVETA) 6 configured to transfer energy from an energy storage device (ESD) 8 at the EV 4, to a load 10. In an example embodiment, the EV 4 is in the form of a battery electric vehicle (BEV) that is powered solely by electricity. However, it is contemplated that the invention can also be practiced with plug-in electric vehicles (PEVs). The EVETA 6 can be configured as a self-contained portable apparatus easily transported to provide power to fixed loads, such as electric grids at public or residential facilities, or mobile loads that can be moved from one location to another.

The ESD 8 can be in the form of a high-voltage traction battery for the EV 4, such as, but not limited to, a multi-celled 300V lithium-ion battery. Alternatively, the ESD 8 can be in the form of a high voltage capacitor or other electrical charge storage device that can be used to provide motoring power for the EV 4. As shown in FIG. 1, the load 10 can be variously embodied, and can be either fixed or transportable. For example, the load 10 can be in the form of an electric grid, such as, but not limited to a microgrid that can receive power through the EVETA 6 should a power outage occur at the residence. Alternatively, an electric grid can be in the form of a grid at a commercial building or complex to which the EVETA 6 can supply emergency power, or can sell supplemental power. The load 10 can also be in the form of electric equipment, such as power tools employed at a remote worksite. For example, the load 10 can be in the form of an electric saw, high-speed drill, or other high or low current power tools used for construction, maintenance or repair. The load 10 can further be in the form of camping equipment deployed at a remote campsite. For example, the load 10 can comprise a microwave oven, a heater, a portable stove, air conditioner and the like. With an EVETA 6, a camper can have access to electricity without having to pack an electric generator which can be rather large, heavy and noisy. In yet a further application, the load 10 can comprise military equipment such as communications devices, computers, heaters, stoves, etc. that may be required at remote field locations. It is noted that the various depictions of the load 10 are not exhaustive, as it is contemplated that the load 10 can be embodied in various additional forms. In an exemplary embodiment, the EVETA 6 can be configured to cooperate with an ESD control module (ESDCM) 9 at the EV 4 as necessary to perform an energy transfer process. By way of example, the EVETA 6 can be configured to communicate with the ESDCM 9 in compliance with predetermined protocols.

Figure 2:
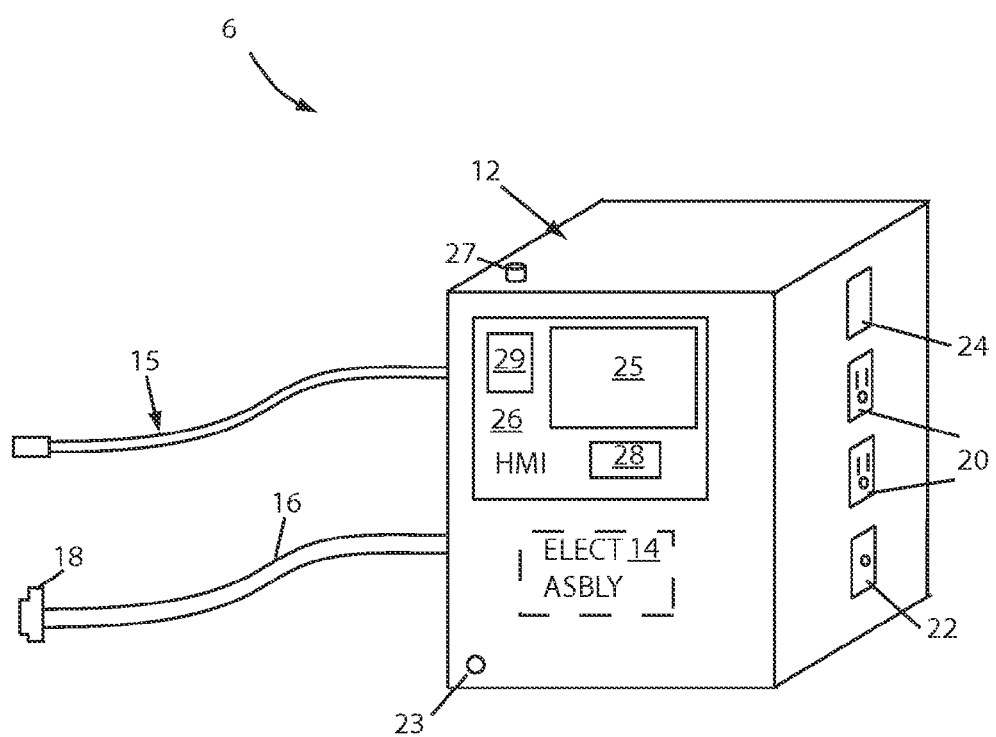
FIG. 2 shows an example EVETA.

FIG. 2 depicts an example embodiment of the EVETA 6 that comprises a portable housing 12 that supports and encloses an electronics assembly 14 configured to transfer energy between an EV and an external load. The portable housing 12 can be sufficiently small to allow an operator to hand carry the EVETA 6 and easily stow it at the EV 4. To couple the EV 4, the EVETA 6 can comprise a cable 16 that extends from the housing 12 and terminates in a coupler 18 adapted for mechanical engagement and electrical connection with an EV 4 charge inlet 19 (See FIG. 3). In an example embodiment, the coupler 18 can be configured to couple the charge inlet 19 in a manner similar to the way EV service equipment (EVSE) couples an EV charge inlet to perform a charging operation. By way of example, the coupler 18 can comprise a power link and communications interface that conforms to Society of Automotive Engineers (SAE) Electric Vehicle and Plug-in Hybrid Electric Vehicle Conductive Charge Coupler standard (J1772) published January, 2013, hereinafter "SAE J1772", which is incorporated herein in its entirety by reference. The cable 16 and coupler 18 can be configured to electrically couple the electronics assembly 14 with the ESD 8. Additionally, the cable 16 and coupler 18 can be configured to couple the electronics assembly 14 with one or more control modules at the EV 4, such as the ESDCM 9, to facilitate authorization, control and implementation of the energy transfer process. For example, a gateway module (not shown), configured for coupling the electronics assembly 14 with an EV communications area network (CAN) (not shown) can be provided at the EV 4, and the cable 16 and coupler 18 can be configured to couple the electronics assembly 14 with the gateway module.

In an example embodiment, the electronics assembly 14 can be configured to receive power for performing its operations from a vehicle low voltage power supply, such as, but not limited to, a vehicle 12V auxiliary battery. Accordingly, the EVETA 6 can include an auxiliary cable 15 configured for coupling to a 12 V power source output at the EV 4. In a further embodiment, a power source (not shown), such as a low voltage battery, can be disposed at an EVETA.

Figure 3:
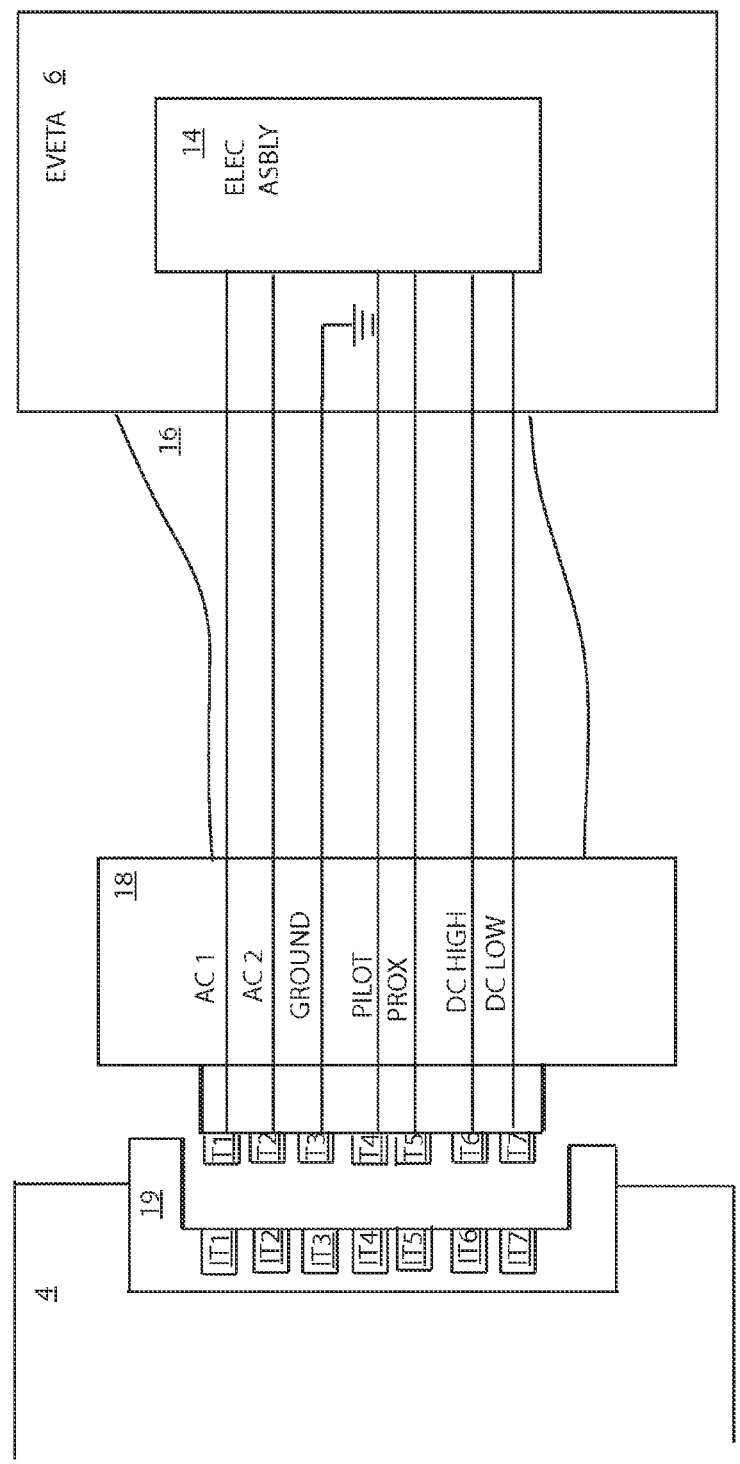
FIG. 3 shows an example EVETA.

FIG. 3 shows an example configuration by which the EVETA 6 can be coupled with the EV 4 via the cable 16 and the coupler 18. In an example embodiment, the coupler 18 can be configured to comply with SAE J1772 standards for EV couplers. By way of example, the coupler 18 can include a plurality of terminals that can electrically couple a charge inlet at the EV 4. For example, terminals T1 and T2 can be configured for AC lines, terminal T3 can be configured for ground line connection, terminal T4 can be configured for pilot line connection, terminal T5 can be configured for proximity line connection, and terminals T6 and T7 can be configured for high voltage DC bus link connection. The cable 16 can include conductors configured to couple the EV 4 ground, pilot, proximity and link voltage lines at the respective terminals T3-T7 of the connector 18 with the electronics assembly 14. In an example embodiment, the coupler 18 can be configured to engage a charge inlet 19 at the EV 4, with the terminals T1-T7 configured to electrically couple with corresponding charge inlet terminals IT1-IT7 to provide electrical connectivity between like electrical lines between the EV 4 and the EVETA 6.

The EVETA 6 can include at least one AC outlet 20 for providing an AC output, for example a single-phase 120V or a 220V AC output. In an example embodiment, the EVETA 6 can include more than one AC outlet, for example first AC outlet providing a 120V output, and a second AC outlet providing a 220V output. It is contemplated that the number of outlets provided can be linked to the power that can be produced by the electronics assembly 14, with those EVETAs providing higher power levels also providing a higher number of outlets. By way of example, but not limitation, a 120V AC outlet can be configured to provide current ranging from 8 amps to 15 amps, and a 220V AC outlet can be configured to provide a 20 amp current. However, it is contemplated that an AC outlet 20 can be configured to provide a 30 amp current for recreational vehicle applications or other high-current loads. By way of example, but not limitation, the AC outlet 20 can be configured to receive an electrical plug at the load 10.

An EVETA can also include a means for providing DC power output, such as, but not limited to at least one a DC power connector 22. The DC power connector 22 can be in the form of a jack or a socket, or other standard type of DC connector configured to mate with a reciprocal connector at the electrical load to be supported. By way of example, one or more DC connectors 22 can be configured to provide an output around 12 V DC and/or 24V DC. In an example embodiment, an EVETA can include a dedicated grid interface 24 for coupling an EVETA to an electric grid. For example, the interface 24 can be in the form of a grid-tied inverter interface. In an example embodiment, the EVETA 6 can comprise a bimodal inverter configured to connect to a utility grid and an EV 4 battery and switch between an "island", i.e. a premises, and a utility grid automatically. A bidmodal inverter can communicate with an EV and draw energy from its battery during a power outage to power equipment at a premises, and can also provide energy to the grid under normal conditions.

A ground connector 23 can also be disposed at the EVETA 6 to provide a ground connection to earth for an AC external load 10, In addition, an emergency stop button 27 can be provided to enable a user to initiate an immediate shutdown of the EVETA 6 if necessary.

The EVETA 6 can further include a human-machine interface (HMI) 26. The HMI 26 can be configured to receive user input, and can include a means for displaying information to a user. In an example embodiment, the HMI 26 can comprise a touch screen 25 that can display information, as well as enable a user to provide input to control an energy transfer process. For example, an operator can use the touch screen to select an option, designate a parameter, or provide a command. By way of example, a user can designate an SOC limit to prevent discharging an EV battery below a specified minimum state-of-charge. Setting an SOC limit allows an operator to ensure that the ESD has sufficient charge to enable an EV to return from a worksite, campsite, or other remote location. In an example embodiment, the HMI 26 can also be configured to allow an operator to select a desired frequency option, such as 50 Hz or 60 Hz, to accommodate domestic users as well as those abroad. User input can also include a password and/or other authentication data to facilitate an authorization process conducted by an EVETA to prevent an unauthorized use of an EV ESD. The touch screen 25 can also be used to display information to a user. For example, using the EV ESD 8 charge capacity and the output power provided by the electronics assembly 14, the EVETA 6 can be configured to display an estimated run time for the electric load 10. In addition, the HMI 26 can be configured to display fault and diagnostic codes to apprise a user of connector faults, internal faults, etc. The HMI 26 can include one or more indicators 28, such as a power on/off indicator, an energy transfer in progress indicator, and the like. By way of example such indicators can be in the form of an LED. The HMI 26 can further include one or more buttons 29, such as a button that can be depressed to power on and power off the EVETA 6, a button that can be depressed to initiate and/or terminate an energy transfer process, etc.

Figure 4:
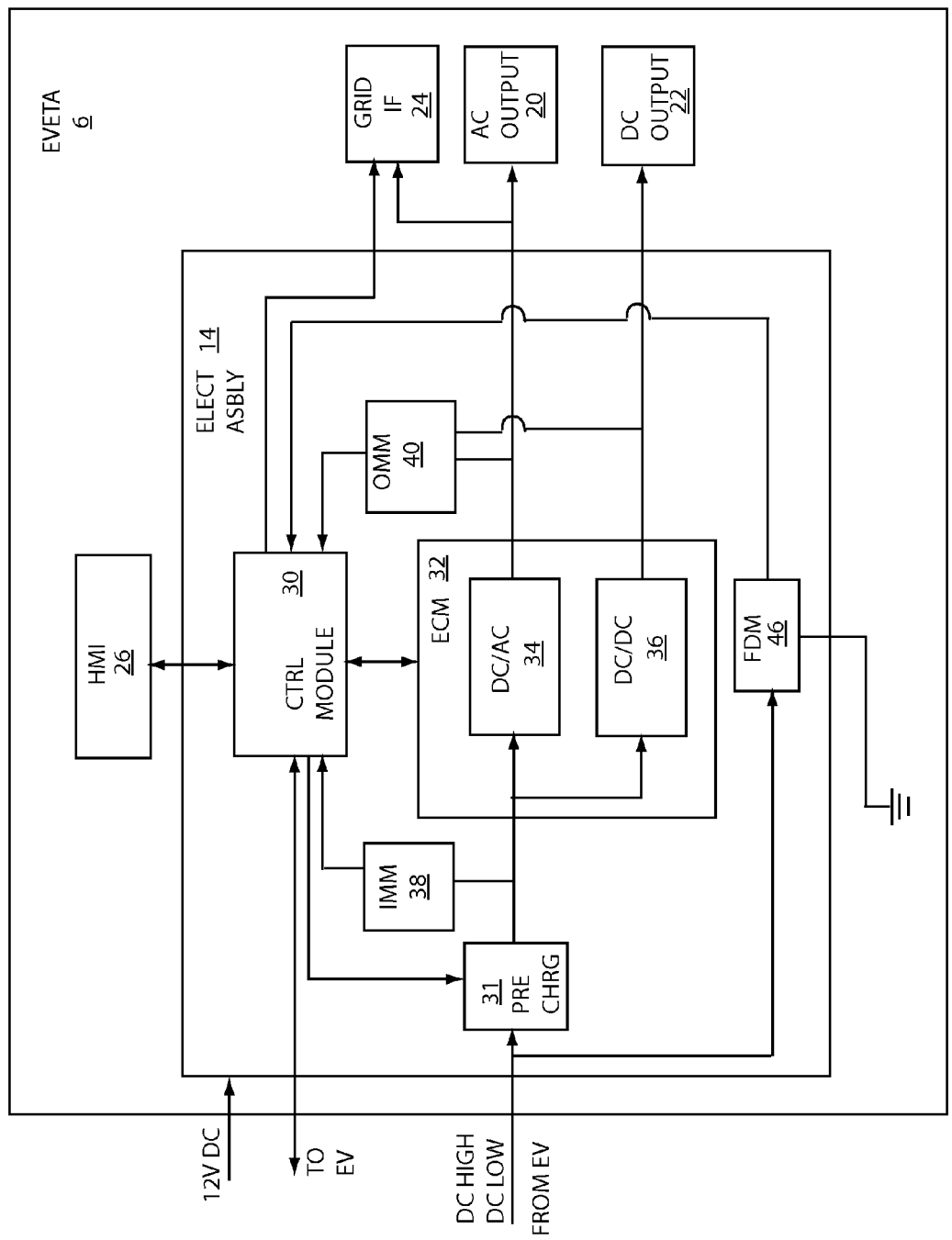
FIG. 4 shows an example EVETA connector and cable.

FIG. 4 depicts an example embodiment of the electronics assembly 14. In this illustrative example, the electronics assembly 14 comprises a control module 30, and an energy conversion module (ECM) 32. The control module 30 can be configured to coordinate and control an energy transfer process, while the ECM 32 can be configured to receive energy from the ESD 8, and provide energy to the load 10. For example, the ECM 32 can be coupled to the high and low voltage bus conductors of the cable 16 to receive energy from the ESD 8. The ECM 32 can comprise hardware, software, firmware, or some combination thereof. By way of example, the ECM 32 can include a DC/AC inverter 34 and a DC/DC converter 36. The DC/AC inverter 34 can be configured to receive a DC voltage from the EV ESD 8 and convert it to an AC voltage that can be provided as output at the AC outlet 20. In an example embodiment, the DC/DC converter 36 can be configured to receive a DC voltage from the ESD 8 and step it down to a lower voltage that can be provided at the DC output connector 22. By way of example, but not limitation, the DC/DC converter 36 can be configured to provide a low voltage output of around 12V.

The electronics assembly 14 can further include an input measurement module (IMM) 38 and an output measurement module (OMM) 40. In an exemplary embodiment, the IMM 38 and OMM 40 are galvanically isolated from other components of the electronic assembly 14. The IMM 38 can be configured to measure the voltage provided to the ECM 32, and in an example embodiment, can further be configured to measure current provided to the ECM 32. By way of example, the IMM 38 can comprise a voltage sensor and a current sensor configured to measure voltage and current at the DC link voltage lines of the cable 16. For example, the IMM 38 can comprise a differential amplifier configured to measure the DC link voltage received from the EV 4. In addition, the IMM 38 can include a Hall Effect sensor disposed at the cable 16 to measure incoming current from the EV 4. The OMM 40 can be configured to measure the ECM 32 output levels. For example the OMM 40 can comprise a first voltage sensor configured to detect the output voltage of the DC/AC inverter 34, and a second voltage sensor configured to measure the output voltage of the DC/DC converter 36. Similarly, the OMM 40 can comprise a first current sensor configured to measure current output of the DC/AC inverter 34, and a second current sensor configured to measure the current output of the DC/DC converter 36. In an example embodiment, the control module 30 can be configured to receive the IMM 38 and OMM 40 measurements to monitor and control ECM 32 operation. Like the IMM 38, the OMM 40 can be configured to provide detected output levels to the control module 30.

The EVETA 6 can be configured to maintain galvanic isolation between the DC link received at the EVETA 6 and the AC output 20, and between the DC link and the EV 4 chassis ground. In an example embodiment, the EVETA 6 can be configured to cooperate with the EV 4 to maintain this galvanic isolation and detect loss of isolation. The control module 30 can comprise hardware, software, firmware, or some combination thereof. In an example embodiment, the control module 30 can comprise a micro-controller or other computing and/or processing device with embedded software. The software can be executable at the micro-controller, and can comprise logic configured for performing data communication and control signaling, both within the EVETA 6, and between the EVETA 6 and the EV 4, as well as logic for performing operations associated with control module 30 functionality. The control module 30 can comprise read-only memory (ROM) for storing logic and instructions, as well as random-access memory (RAM) for storing data received in real-time during EVETA 6 operation.

As discussed in further detail below, the control module 30 can be configured to perform a variety of tasks that can include, but not be limited to: energy transfer authorization, fault detection, commencement and termination of an energy transfer process, inverter control, monitoring of EVETA state, and monitoring of EV ESD SOC. The control module 30 can be configured to perform or facilitate an authorization process to protect against energy theft by an unauthorized user. Various schemes can be implemented to authorize an energy transfer process. By way of example, the control module 30 can be configured to cooperate with the HMI 26 to receive a password, user identification code, authorization code or the like, prior to commencement of an energy transfer process. The control module 30 can be configured to compare a received authorization code to a code previously stored at the control module 30 in order to validate a user and authorize the energy transfer process. In an example embodiment, a code stored at the control module 30 can be associated with a particular vehicle. Because different vehicles can have different codes, the control module 30 can be configured to receive both a vehicle code and an authorization code, and can be configured to determine whether each matches a vehicle and authorization code pair previously stored at the EVETA 6.

It is anticipated that the EV 2 may be configured to exert some degree of control over the discharge of the ESD 8, for example it may require that a user be authorized before a transfer process can begin, and may require that published power limits be observed during the transfer process. Accordingly, in an example embodiment, the control module 30 can be configured to provide a received user identification or authorization code to the ESDCM 9 at the EV 4 which can be configured to determine whether the received code matches a stored predetermined code. In an example embodiment, the control module 30 can be configured for data communication with the ESDCM 9 via predetermined protocols, such as those described in the SAE J1772 standard. By way of example, via a data communication link enabled by the cable 16 and connector 18, such as through the pilot line connection at T4 and the ground line connection at T3, the control module 30 can be configured to communicate with a gateway module (not shown) which can be configured to receive messages from the control module 30, and provide them in the proper format to the ESDCM 9. The ESDCM 9 can then perform a user authentication and/or authorization process and communicate its results back to the control module 30 through the gateway module. The control module 30 can then cooperate with the HMI 26 to inform a user that the transfer process is authorized or denied.

In an alternative embodiment, the control module 30 can be configured to detect the proximate presence of a key or key fob to the EV 4 as part of an authorization process. For example, a receiver (not shown) at the EVETA 6 can be configured to receive a signal emitted by an EV 4 key or key fob. The control module 30 can be configured to authorize a transfer process when a signal is detected, and one or more of its parameters, such as frequency, matches a signal parameter associated with the EV 4 and previously stored at the control module 30. Alternatively, an identification code associated with an RF-equipped key/key fob to the EV 4 can be associated with the EVETA 6 and stored at the control module 30. A receiver at the electronics assembly 14 can be configured to receive a signal from a proximate key, detect its ID, and provide it to the control module 30 for comparison to one or more previously stored key ID codes. In a further embodiment, as described above, the control module 30 can provide the key code to the ECDCM 9 at the EV 4 for user validation and energy transfer authorization. Alternatively, the RF-ID detection process can be performed at the EV 4 and its results communicated to the control module 30. It is anticipated that further authorization schemes will occur to those skilled in the art.

In an example embodiment, the control module 30 can be configured to authorize/allow an energy transfer process after a user has been authenticated. However, it is contemplated that the control module 30 can be configured to perform other tasks as part of an authorization process, including establishing data communication with the EV 4 and confirming the absence of critical faults at the EV 4 and/or EVETA 6 checking for the presence of any faults. The control module 30 can be configured to deny authorization when a data link cannot be established or a critical fault is detected. The control module 30 can be configured to start and stop an energy transfer process. In an exemplary embodiment, after a transfer process is authorized, the control module 30 can be configured to send a start signal to the ESDCM 9, which, in response, can be configured to close relays to connect the ESD 8 HV high and low voltage buses to the connector 18 terminals 6 and 7. In an example embodiment, additional relays (not shown) can be disposed at the EVETA 6 to couple high and low voltage bus line conductors within the cable 16 to the electronics assembly 14, and the control module 30 can be configured to close the additional relays to enable an energy transfer process. By way of example, the EVETA 6 can include a pre-charge circuit 31 to limit inrush current when a transfer process begins. In addition, an EVETA can include safety relays, contactors, switches or the like to physically disconnect an EV connection through the cable 16, the AC output 20 or the DC output 22 in compliance with safety standards and regulations.

The control module 30 can also be configured to monitor fault conditions prior to and during an energy transfer. By way of example, but not limitation, the type of faults that can be monitored can include loss of safety ground, loss of high voltage isolation, loss of communication, thermal fault at the connector 18, and interruption of power transfer. In an example embodiment, fault detection can be performed at the EV 4. When a fault is detected at the EV 4, a fault message can be communicated to the control module 30 via the pilot and ground lines between the EV 4 and the control module 30. In an example embodiment, an EVETA can be configured to detect the presence of a fault, such as a poor connection between an EV charge inlet and the connector 18, a communications link failure, or a fault at an EVETA itself. For example, the control module 30 can be configured to detect loss of communication with the EV 4, interruption of power transfer between the EV 4 and the EVETA 6, or interruption of power transfer between the EVETA 6 and the load 10. Sensor data from the IMM 38 can be used to determine whether there is a loss of connectivity between the EVETA 6 and the EV 4. For example, loss of a data or control link between the EVETA 6 and the EV 4, or input current or voltage levels that fall below a predetermined threshold, can indicate a connectivity fault. In an example embodiment, the controller 30 can be configured to monitor ECM 32 operation in order to check for faults. For example, the control module 30 can be configured to use data received from the OMM 44 to determine whether ECM 32 output levels fall within a predetermined range.

In an exemplary embodiment, a fault detection module (FDM) 46 at the EVETA 6 can be configured to detect isolation faults and report them to the control module 30. In an example embodiment, the FDM 46 can comprise a ground fault detector for AC or AC/DC systems, such as the Bender™ IR-155 03-04 series, or the Bender™ IR-155 10 series ground fault detector for electric vehicles. The Bender devices can be embodied as pc boards with small footprints and various input and output options that can be integrated with the electronics assembly 14. By way of example, the control module 30 can be preprogrammed with isolation set points in accordance with industry and/or or manufacturer standards. In response to the detection of an isolation fault, at either the EV 4 or at the EVETA 6, the control module 30 can be configured to provide a fault report to the ESDCM 9 through a communication link with the EV 4 provided by the cable 16 and connector 18. The ESDCM 9 can respond in a predetermined manner to controllably coordinate termination of the charge transfer process. In addition, a fault error code can be displayed to a user at the HMI 26. In an example embodiment, the control module 30 can be configured to respond in a similar manner to the detection of faults other than isolation faults. However, it is contemplated that a fault detection response at an EVETA can include the control module 30 adjusting or terminating EVETA 6 operation in response to a fault detection. In addition to fault condition monitoring, the control module 30 can also be configured to monitor EVETA state. For example, the control module 30 can be configured to monitor EVETA internal temperature so that an energy transfer process can be terminated if internal temperatures exceed a predetermined threshold. By way of example, the control module 30 can be configured to receive temperature data from a temperature sensor (not shown) disposed at the EVETA 6, and compare the temperature to a predetermined maximum temperature. In an example embodiment, a high-powered EVETA may include a fan or other device to improve heat dissipation and reduce the chance of experiencing a heat-related fault. In addition, an EVETA can be configured to monitor temperature at the connector 18 and detect a fault when the connector 18 temperature exceeds a predetermined threshold. For example, a temperature sensor can be disposed at the cable 16.

To prevent over-discharge of a vehicle battery during an energy transfer process, an EVETA can be configured to terminate the process when a predetermined SOC limit is reached. For example, a user can be prompted to provide a minimum required SOC limit at the HMI 26 prior to commencement of an energy transfer process. The minimum limit can reflect the amount of energy that is expected to be required for the donor vehicle to travel from an energy transfer site to an intended destination. By way of example, a minimum SOC limit can be provided to a user by a navigation module at the EV 4 that can be configured to use a route optimization algorithm that employs various data such as sun position, ambient environmental data, EV 4 state data, region topography, current location, destination location and traffic control parameters to determine the amount of charge required to travel a particular distance (such as a return-to-base or return-to-home distance). For example, a navigation module can be configured to provide route information based on battery charge state as taught by U.S. Pat. No. 7,865,298 to Macneille and Loftus, entitled "System and Method for Providing Route Information to a Driver of a Vehicle", issued Jan. 4, 2011, which is incorporated in its entirety herein by reference. The control module 30 can be configured to store the predetermined SOC limit received from the user.

In an example embodiment, the control module 30 can be configured to monitor the SOC of the ESD 8, and terminate an energy transfer when a predetermined SOC level limit is reached. In an example embodiment, the control module 30 can be configured to receive SOC updates from the EV4 through a communications link provided at the coupler 18 and cable 16, or alternatively via a separate interface (not shown). For example, the ESDCM 9 can be configured to dynamically calculate the ESD 8 SOC and publish it on a CAN system for the EV 4. A gateway module at the EV 4 can detect the message, and reformat as necessary to provide it to EVETA 6 through the cable 16. The control module 30 can compare the received SOC to the predetermined SOC limit. The control module 30 can be configured to terminate an energy transfer process in response to user input (such as an operator turning an EVETA off), in response to a fault detection, or in response to reaching a predetermined SOC limit. In an example embodiment, an EVETA can be configured to perform a predetermined termination process in coordination with the ESDCM 9. For example, the EVETA can be configured to send a message to the ESDCM 9 to open the charge contactors that couple the ESD 8 to the charge inlet 10. In an example embodiment, the control module 30 can be configured to ramp down the power level to zero and shut off operation of the ECM 32 as part of performing a termination process.

The control module 30 can be configured to control an energy transfer process conducted by the EVETA 6 in coordination with the ESDCM 9. A primary control interface with the ESDCM 9 is to request closure of a charge contactor for the ESD 8, and to manage energy transfer from the ESD 8. A primary means of control handshaking with the ESDCM 9 is through Power Limits. This information can be published by the ESDCM 9 on a data link to the control module 30. The power limits indicate the power wattage that the ESD 8 is able to provide. The control module 30 can use this information to control the power provided by the DC/AC inverter 34 to the AC output 20, and the power and voltage provided by the DC/DC converter 36 to the DC output 22.

In an example embodiment, the control module 30 can be configured to cooperate with the grid interface 24 to synchronize a 60 Hz AC voltage of the DC/AC inverter 34 with that of a coupled electric grid. In addition, the pair can be configured to resolve compatibility issues between the EV 4 and the coupled grid, be configured to interface with local power management of a coupled grid. The EVETA 6 can further be configured with safeguards that can protect service personnel that may be servicing a circuit to which an EVETA is coupled.

In an example embodiment, the control module 30 can be configured to determine a run time for a load coupled to the EVETA 6. For example, the control module 30 can be configured to use ECM 32 output reported by the OMM 40, the current ESD 8 SOC provided by the EV 4, and a predetermined SOC limit to determine an expected run time for a load 10 that can be displayed to a user at the display 25 of the HMI 26.

Figure 5:
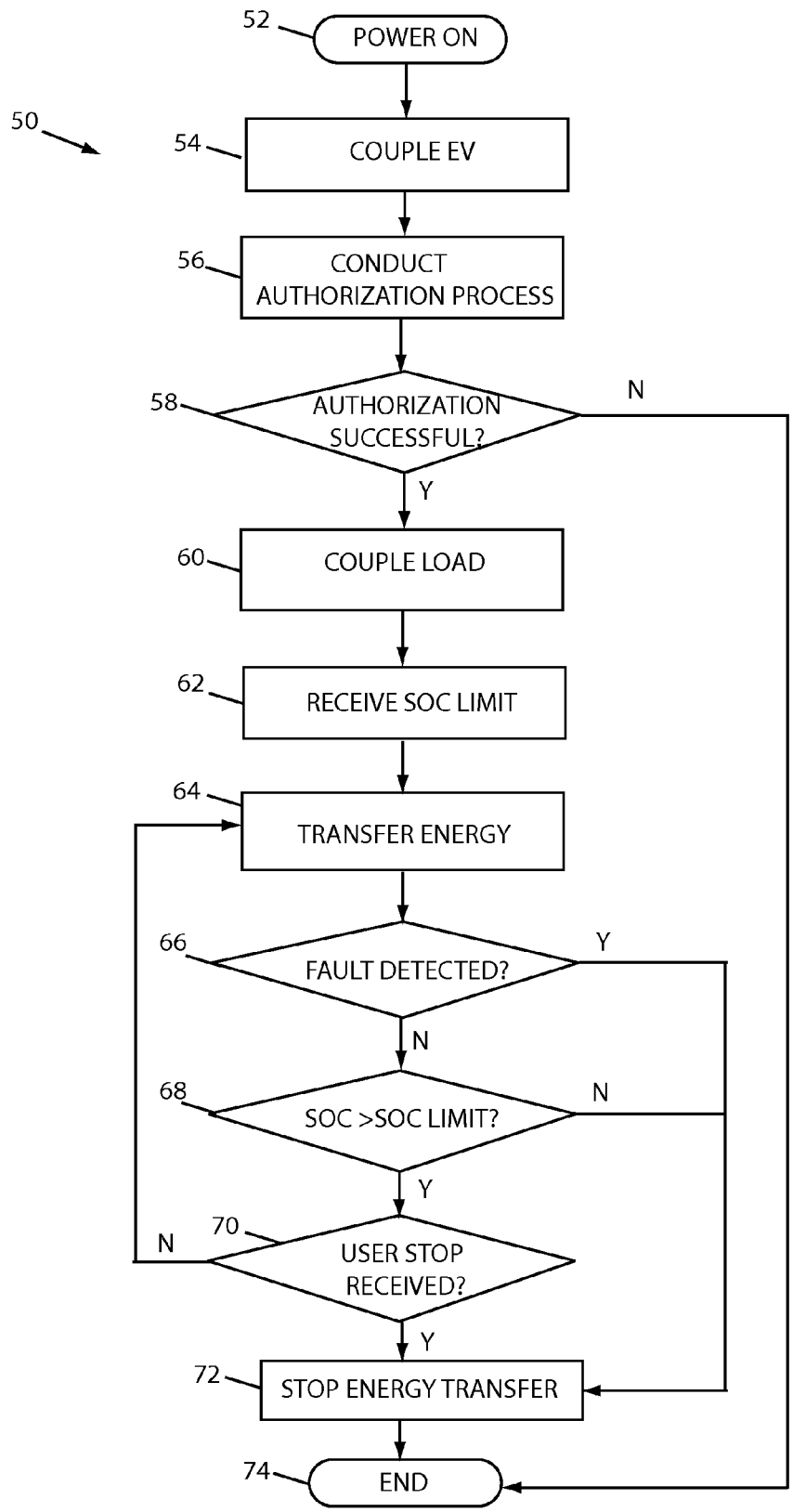
FIG. 5 shows a flow diagram of an example method.
Figure 6:
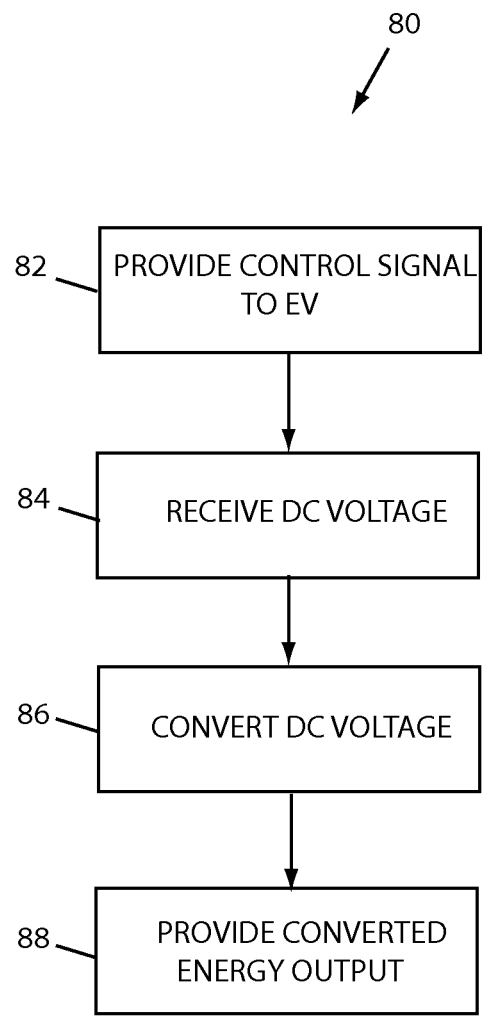
FIG. 6 shows a flow diagram of an example method.

FIG. 5 depicts an example method 50 for transferring energy from an EV ESD to a load external to an EV. At block 52, an EVETA can be powered on. For example, the auxiliary cable 15 can be coupled to a 12V power output at the EV 4 and a user can depress a power button 29. At block 54 an EV can be coupled. For example, the connector 18 of the EVETA cable 16 can engage a charge inlet at the EV 4. At block 56, an authorization process can be conducted. For example, an identification code can be received at the control module 30 either from the HMI 26 or from a receiver (not shown) at the EVETA 6, and compared to one or more codes previously stored at the control module 30 in association with the EV 4. If the comparison performed at block 56 results in a match, a transfer can be authorized, if not a transfer can be denied. Any fault detection procedures required for authorization can also be performed, as well as an ESD 8 SOC check, and the results received at the control module 30. At decision block 58, the results of the authorization process can be processed and applied. For example, if a user has been authenticated and no fault flags have been received, a transfer is authorized, and the method 50 can proceed to block 60. However if the identification code did not match any previously stored codes, or if a fault signal was received, the authorization is denied and the method 50 can terminate at block 74. In an example embodiment, an "AUTHORIZATION DENIED" or other error message can be displayed at the HMI 26 to inform a user that the transfer process will not proceed. At block 60, an electric load can be coupled. For example, a plug of an extension cord coupled to a power drill can be received at the outlet 20. At block 62, an SOC limit can be received. For example, an SOC limit can be received at the control module 30 via user input at the HMI 26. At block 64, energy can be transferred between an EV ESD and the load. As discussed previously herein, the EVETA 6 can be configured to control an energy transfer process. FIG. 6 depicts a flow diagram of an example method 80 by which energy can be transferred. At block 82, a control message can be provided to the EV 4. For example, the control module 30 can send a "CLOSE CONTACTS" signal to the ESDCM 9 via the cable 16, connector 18, the charge inlet 19 at the EV 4, and an EV 4 gateway module (not shown) that is communicatively coupled to the EV 4 charge inlet 19 and is configured for communication with the ESDCM 9. The control signal can be configured to cause the ESDCM 9 to close contacts that couple a DC link of the ESD 8 with an EV 4 charge inlet 19. At block 84, energy can be received from the ESD 8. In an example embodiment, to prevent damage to the electronics assembly from fast inrush current, a DC voltage bus can initially be provided to the pre-charge circuit 31 until the bus voltage is sufficiently high, at which point the pre-charge circuit can be bypassed. For example, a DC voltage can be received at the ECM 32 via high and low voltage bus conductors within the cable 16. At block 86, energy received at the EVETA 6 can be converted. For example, a DC voltage received at the ECM 32 can be converted to an AC voltage at the DC/AC inverter 34. At block 88, a converted voltage output can be provided. In an example embodiment, a converted voltage output can comprise a high or low voltage AC output, or a low voltage DC output. For example, a 120V AC voltage produced at the DC/AC inverter 34 can be provided as output at the AC outlet 20.

Referring back to FIG. 5, the method 60 can continue at block 66 where a check can be performed to see whether a fault is present. By way of example, the control module 30 can check to see whether a fault flag has been set. For example, a fault flag can be set in response to receiving a fault signal from the ESDCM 9 or the FDM 46, in response to signals received from the IMM 38 or the OMM 40, or in response to the failure to receive expected data communications from the EV 4. If a fault is present, the energy transfer process can terminate at block 72, otherwise the method 50 can continue to block 68 at which a determination can be made as to whether an ESD SOC exceeds a predetermined SOC limit. For example the control module 30 can compare a current ESD 8 SOC provided by the ESDCM 9 to a predetermined limit received from a user and stored at the control module 30. If the current ESD SOC exceeds the predetermined limit, the method 50 can continue to block 70, otherwise the method 50 can terminate at block 72. At block 70 a determination can be made as to whether a user has manually stopped the energy process. For example, a determination can be made as to whether a user has depressed a stop button at the HMI 26. If not, the method can continue at block 64, if so the transfer process can terminate at block 72. By way of example, at block 72 the control module 30 can provide an "OPEN CONTACTS" signal to the ESDCM 9 which can cause it to open contacts between the ESD 8 and a charge inlet at the EV 4 to stop current flow between the ESD 8 and the EVETA 6. In an example embodiment, the EVETA 6 can be configured to perform a controlled shutdown in which current is ramped down to zero prior to the opening of the EV 4 charge contacts to avoid welding contacts or compromising user safety during EVETA 6 disconnection. In an example embodiment, the control module 30 can continue to monitor EVETA 6 output until the IMM 38 and the OMM 40 measurements indicate that the voltage input and voltage output at the ECM 32 is at or below a predetermined maximum. An example method can further include monitoring voltage levels at charge inlet terminals associated with high and low ESD 8 voltage buses. In an example embodiment, a pre-charge by-pass switch at the pre-charge circuit 31 can be opened by the control module 30 when current at the ECM 32 is determined to be zero. When all monitored voltages are determined to be within predetermined safe ranges, at block 74 the control module 30 can be configured to cooperate with the HMI 26 to display a message to a user that it is safe to release the coupler 18 from the charge inlet 19 at the EV 4, and unplug the load 10 from the EVETA 6, and the method can end. A user can then depress the power button to turn the EVETA 6 off.

Thus, the invention provides an apparatus, system and method for using the energy stored in a traction battery of an EV to power various non-vehicle electric loads. The invention can be used in V2H and V2G applications to reduce electricity costs or supply emergency power. It can also be used to power appliances, tools and equipment at remote construction or camping sites not serviced by an electric grid. Its portability and self-contained nature give it distinct advantages and flexibility over prior art V2H systems which are constrained by the installation of control devices and power converters at a stationary building. An EVETA can be configured to conduct an energy transfer while ensuring that the battery will have sufficient charge to power a vehicle to an intended re-charging destination. An apparatus of the invention can include both AC and DC outputs, and can be used to power multiple devices simultaneously. It can be configured to receive user input, and to allow a user to stop an energy transfer process at any time. An EVETA can have consumer, commercial and even military applications. Many times troops are deployed in remote locations that have no utility service. Ironically, it is at those very sites that the ability to communicate, perform operations on a computer, provide warmth, or power medical equipment, tools or other types of equipment may be the most urgent. While a generator may be available to satisfy necessary energy needs, its noise signature can be rather loud and obvious, and the need to transport it usurps valuable cargo space on a military transport vehicle. The EVETA ability to service electrical needs of a soldier in an efficient, quiet, inobtrusive manner may, in some instances, prove critical to troop survival. A soldier operating an electrified vehicle can have both his transportation and his energy needs met when he has an EVETA onboard. Its configuration to conduct an authorization process prevents its use to aid and abet the enemy if it falls into enemy hands.

As required, illustrative embodiments have been disclosed herein, however the invention is not limited to the described embodiments. As will be appreciated by those skilled in the art, aspects of the invention can be variously embodied, for example, modules and programs described herein can be combined, rearranged and variously configured. Methods are not limited to the particular sequence described herein and may add, delete or combine various steps or operations. The invention encompasses all systems, apparatus and methods within the scope of the appended claims.

What is claimed:

1. A system comprising:
    an electrified vehicle (EV); and
    a stand-alone self-contained EV energy transfer apparatus (EVETA) releasably coupled to said EV, comprising an electronics assembly encased at a hand-portable housing, said housing configured to receive an external AC load, said EVETA configured to transfer energy from an energy storage device (ESD) at said EV to an electric load releasably coupled to said EVETA, said electric load external to said EV and said EVETA, said EVETA comprising a cable affixed to and extending from said housing at a first end including at its opposing end a connector configured for releasably electrically coupling a charge inlet at said EV, said charge inlet compatible with electric vehicle service equipment (EVSE) charging apparatus, said cable configured to provide energy from said EV ESD to said EVETA, a DC/AC inverter configured to receive DC input from said EV ESD via said cable, said cable directly coupled to a pre-charge circuit directly coupled to said DC/AC inverter, and provide AC output to an AC outlet at said housing, a controllable DC/DC converter directly coupled to said pre-charge circuit and configured to provide a DC output, a control module configured to authorize said energy transfer, a human machine interface (HMI), and a fault detection module (FDM) configured to detect an isolation fault.

2. The system of claim 1, wherein said load comprises an electric grid and said EVETA housing comprises a dedicated grid interface for coupling said AC output to said grid.

3. An electrified vehicle (EV) energy transfer apparatus (EVETA), comprising:
    a hand-portable housing;
    a cable attached to said housing, said cable having a connector configured for releasably electrically coupling a charge inlet at said EV, said cable comprising a DC power link, an AC power link and a communications link;
    an electronic assembly encased at said housing and configured to transfer energy from an EV energy storage device (ESD) releasably coupled to said EVETA via said connector at said charge inlet to a load releasably coupled to said EVETA, said load external to said EV and said housing,
    said electronics assembly comprising an energy conversion module (ECM) having a DC/AC inverter configured to receive input from said EV ESD via said cable, said cable directly coupled to a pre-charge circuit directly coupled to said DC/AC inverter, and provide AC output at an AC outlet at said housing, a controllable DC/DC converter configured to receive DC input from said EV ESD from said cable, said cable directly coupled to said pre-charge circuit directly coupled to said DC/DC converter, and provide output to a DC power connector at said housing, a control module configured to communicate with said EV and control output of said ECM, and a fault detection module configured to detect an isolation fault.

4. The EVETA of claim 3, further comprising a human machine interface (HMI).

5. The EVETA of claim 3, wherein said EVETA is configured to receive a state of charge (SOC) lower limit for said EV ESD, and terminate said energy transfer from said EV ESD prior to reducing said EV ESD SOC below said limit.

6. A method, comprising:
    the step of authorizing, at a hand-portable electrified vehicle energy transfer apparatus (EVETA) configured to receive an AC load, an energy transfer from an electric vehicle (EV) energy storage device (ESD) to a load external to said EV and to said EVETA;
    the step of said EVETA releasably electrically coupling an electrified vehicle (EV) at a charge inlet at said EV, said charge inlet compatible with electric vehicle service equipment (EVSE), said EVETA comprising a hand-portable housing, a cable attached to said housing having a connector configured for releasably electrically coupling said charge inlet, said cable comprising a DC link, a communications link and an AC link, and an electronics assembly encased at said housing;
    the step of said EVETA releasably coupling an electric load external to said EV and to said EVETA;
    the step of said EVETA transferring energy from an energy storage device (ESD) at said EV to said electric load;
    wherein said electronics assembly comprises an energy conversion module (ECM) comprising an inverter configured to directly receive DC input from said EV ESD via said cable and provide said AC output to an AC outlet at said housing, and a DC/DC converter configured to receive DC input from said EV ESD via said cable and provide output to a DC power connector at said housing, a control module configured to control said DC/DC converter output, and a fault detection module (FDM) configured to detect an isolation fault;

wherein said cable is directly coupled to a pre-charge circuit directly coupled to the DC/AC inverter and the DC/DC converter; and wherein said authorizing comprises using information stored at said EVETA or said EV without access to a remote server.

7. The method of claim 6, wherein said load comprises an electric grid.

8. The method of claim 6, further comprising the step of said EVETA receiving a predetermined state-of-charge (SOC) limit for an energy storage device (ESD) at said EV, monitoring said ESD SOC during said energy transfer, and terminating said energy transfer prior to said SOC falling below said limit.

9. The EVETA of claim 3, further comprising a ground connector configured to provide a ground connection for said AC load.

10. The EVETA of claim 3, further comprising a dedicated grid interface at said housing.

11. The EVETA of claim 3, wherein said electronics assembly comprises a input measurement module (IMM) directly coupled to said control module and to said input to said DC/AC inverter, and configured to monitor ECM input, an output measurement module (OMM) directly coupled to said control module and to said DC/AC inverter output, and configured to monitor ECM output, and a pre-charge circuit directly coupled to said connector and said DC/AC inverter.

12. The EVETA of claim 3, wherein said ECM is configured to directly provide all output to one or more output connections at said housing.

13. The EVETA of claim 3, wherein said control module is configured to detect absence or loss of communication with said EV.

14. The EVETA of claim 3, wherein all energy provided to said load originates from said EV ESD during said transfer.

15. The system of claim 1, wherein said EVETA is configured to authorize said energy transfer without communication with a remote server or communication device.

16. The EVETA of claim 3, wherein said AC output of said inverter is controllable.

* * * * *